United States Patent [19]

Kyoden

[11] Patent Number: 5,731,558
[45] Date of Patent: Mar. 24, 1998

[54] SWITCHING DEVICE

[75] Inventor: Tatsuo Kyoden, Isehara, Japan

[73] Assignee: Ichikoh Industries, Ltd., Tokyo, Japan

[21] Appl. No.: 773,356

[22] Filed: Dec. 26, 1996

[30] Foreign Application Priority Data

Dec. 28, 1995 [JP] Japan .......................... 7-342697

[51] Int. Cl.$^6$ ............................................... H01H 25/04
[52] U.S. Cl. .................. 200/5 R; 200/6 A; 200/16 C; 200/16 D
[58] Field of Search ........................ 200/1 R, 5 R, 200/11 E, 11 EA, 11 J, 11 K, 16 C, 16 D, 17 R, 18, 547, 548, 549, 553, 557, 6 A

[56] References Cited

U.S. PATENT DOCUMENTS

| | | | |
|---|---|---|---|
| 4,455,459 | 6/1984 | Smith | 200/5 R |
| 4,816,662 | 3/1989 | Kyoden | 200/5 R |
| 4,866,221 | 9/1989 | Obermann et al. | 200/5 R |
| 4,937,402 | 6/1990 | Kyoden | 200/5 R |

*Primary Examiner*—Khanh Dang
*Attorney, Agent, or Firm*—Foley & Lardner

[57] ABSTRACT

A switching device is provided which comprises a casing, a printed wiring board disposed inside the casing, a plurality of fixed contacts formed on the casing, and a plurality of moving contacts for making an electrical connection or disconnection between said plurality of fixed contacts. Since many fixed contacts are not only disposed on the printed wiring board but also on the casing, the printed wiring board can be designed compact. Also the plurality of fixed contacts disposed on the casing has such a form of a terminal as to be electrically connectable to motors and a power source as well as to a connector extended to the switching device. Therefore, the number of places to be soldered for electrical connection between many fixed contacts, motors and power source can be reduced.

8 Claims, 17 Drawing Sheets

SWITCHING DEVICE

BACKGROUND OF THE INVENTION a) Field of the Invention

The present invention relates to a switching device, and more particularly to a switching device suitable for use as a two-way switch, a four-way switch or a combination of the two-way and four-way switches.

It should be noted that in the description of the prior art and the detailed description of the preferred embodiments, "two-way" means two opposite directions along a straight line passing through a predetermined position (neutral position) in a plane, that is, ±x-directions, and "four-way" means four different directions including two opposite directions along a straight line passing through a neutral position in a plane and other two opposite directions along another straight line perpendicular to the former straight line also passing through the neutral position, that is, ±x-directions and ±y-directions.

b) Description of the Prior Art

Among the conventional switching devices of this kind, a typical remote control switch to tilt the mirror surface of a car side-view mirror is generally a combination of a two-way switch and a 4-way switch, intended to select a desired one of two motors provided to turn vertically and horizontally the mirror surface of a side-view mirror located at the left side of a car body and two motors provided to turn vertically and horizontally the mirror surface of a side-view mirror located at the right side of the car body, and also intended to run the motors forward or reversely.

A switching device of this type is known from the disclosure in the U.S. Pat. No. 4,937,402.

The prior-art switching device comprises at least two fixed contact groups each including a plurality of fixed contacts, and a plurality of moving contacts to make an electrical connection or disconnection between some of the fixed contacts included in one of the two fixed contact groups and some of the fixed contacts included in the other fixed contact group. The plurality of fixed contacts is made by printing an electrically conductive material on a substrate fixed inside a casing, and the plurality of moving contacts is formed from an electrically conductive material on a changeover member disposed movably on the substrate. The size of such a switching device depends primarily upon the size of the substrate. Therefore, the more the fixed contacts formed on the substrate, the larger the size of the switching device is. For the electrical connection between the plurality of fixed contacts on the substrate, four motors and a power source, soldering has to be done at many places on the substrate.

SUMMARY OF THE PRESENT INVENTION

The present invention seeks to provide a switching device having a more compact printed wiring board on which a plurality of fixed contacts is disposed.

The present invention also seeks to provide a switching device in which soldering is required at a reduced number of places for electrical connection between the plurality of fixed contacts, motors and power source.

The above object can be accomplished by providing a switching device in which a plurality of fixed contacts is not only disposed on the printed wiring board but only on a casing of the switching device, each of the plurality of fixed contacts disposed on the casing consisting of contact portions lying in a plane where the printed wiring board also lies, and terminal portions extended from the contact portions to outside the printed wiring board.

The switching device according to the present invention comprises a casing; a printed wiring board disposed inside the casing; a first fixed contact group including a plurality of fixed contacts formed integrally with the casing, each of the fixed contacts consisting of a contact portion lying substantially in a plane in which the printed wiring board also lies and a terminal portion extended to outside the casing; a second fixed contact group including a plurality of fixed contacts formed on the printed wiring board; and a changeover member provided with first and second moving contacts corresponding to said first and second fixed contact groups and which are disposed movably inside said casing; the first and second moving contact groups being so arranged as to slide and make an electrical connection or disconnection between the first and second fixed contact groups as the changeover member is moved.

The plurality of fixed contacts on the printed wiring board should preferably be formed by printing, and the plurality of fixed contacts on the casing be formed integrally as buried in the casing being molded.

These and other objects and advantages of the present invention will be better understood from the ensuing description made, by way of example, of the preferred embodiments of the present invention with reference to the drawings.

BRIEF DESCRIPTION OF THE DRAWINGS

FIGS. 1A and 1B are exploded perspective views, respectively, of an embodiment of the switching device according to the present invention, FIG. 1A showing a half of a switching mechanism including an upper case while FIG. 1B shows the other half of the switching mechanism including a lower case, printed wiring board and the like;

DETAILED DESCRIPTION OF THE PREFERRED EMBODIMENTS

Figure 1A:
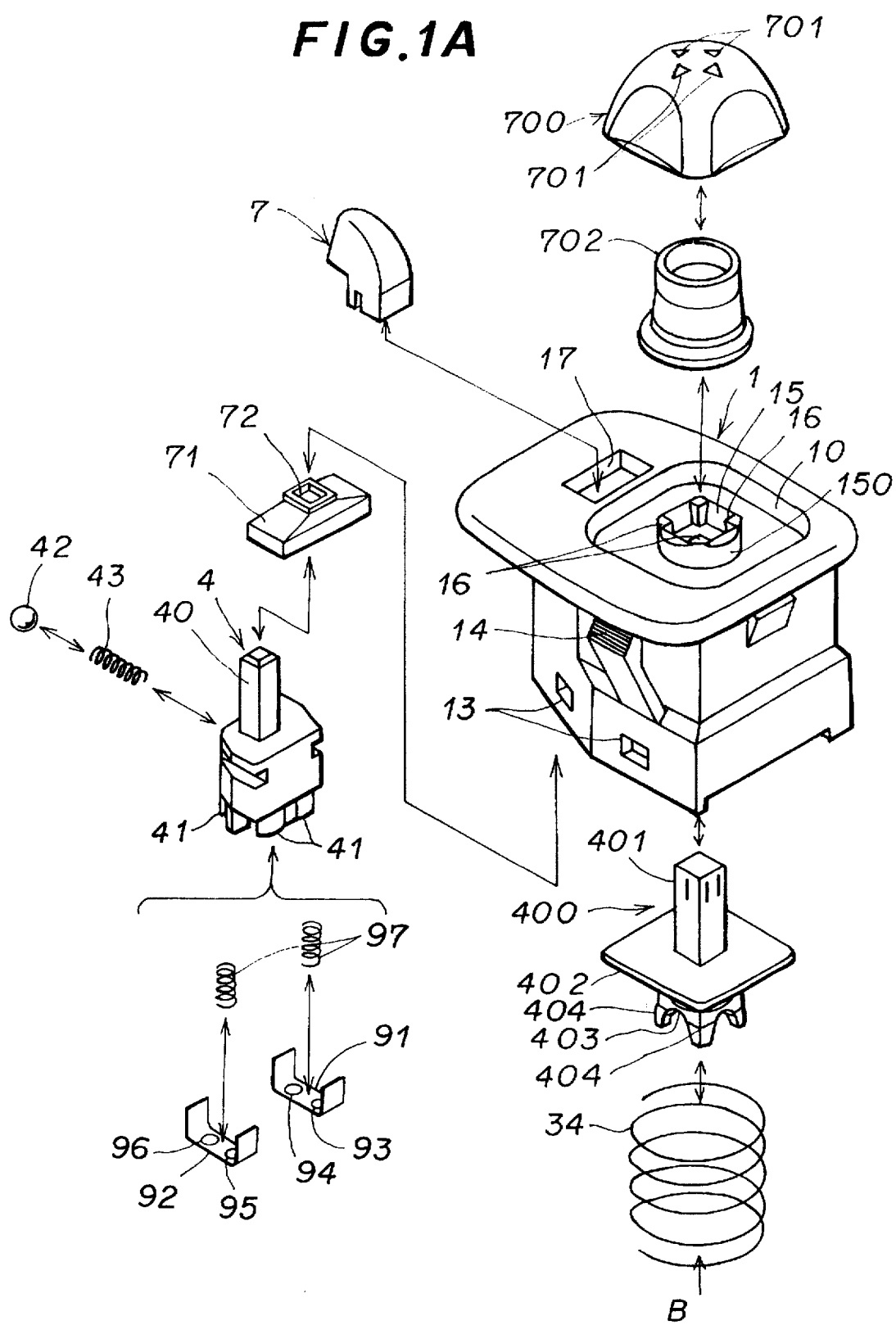
Figure 1B:
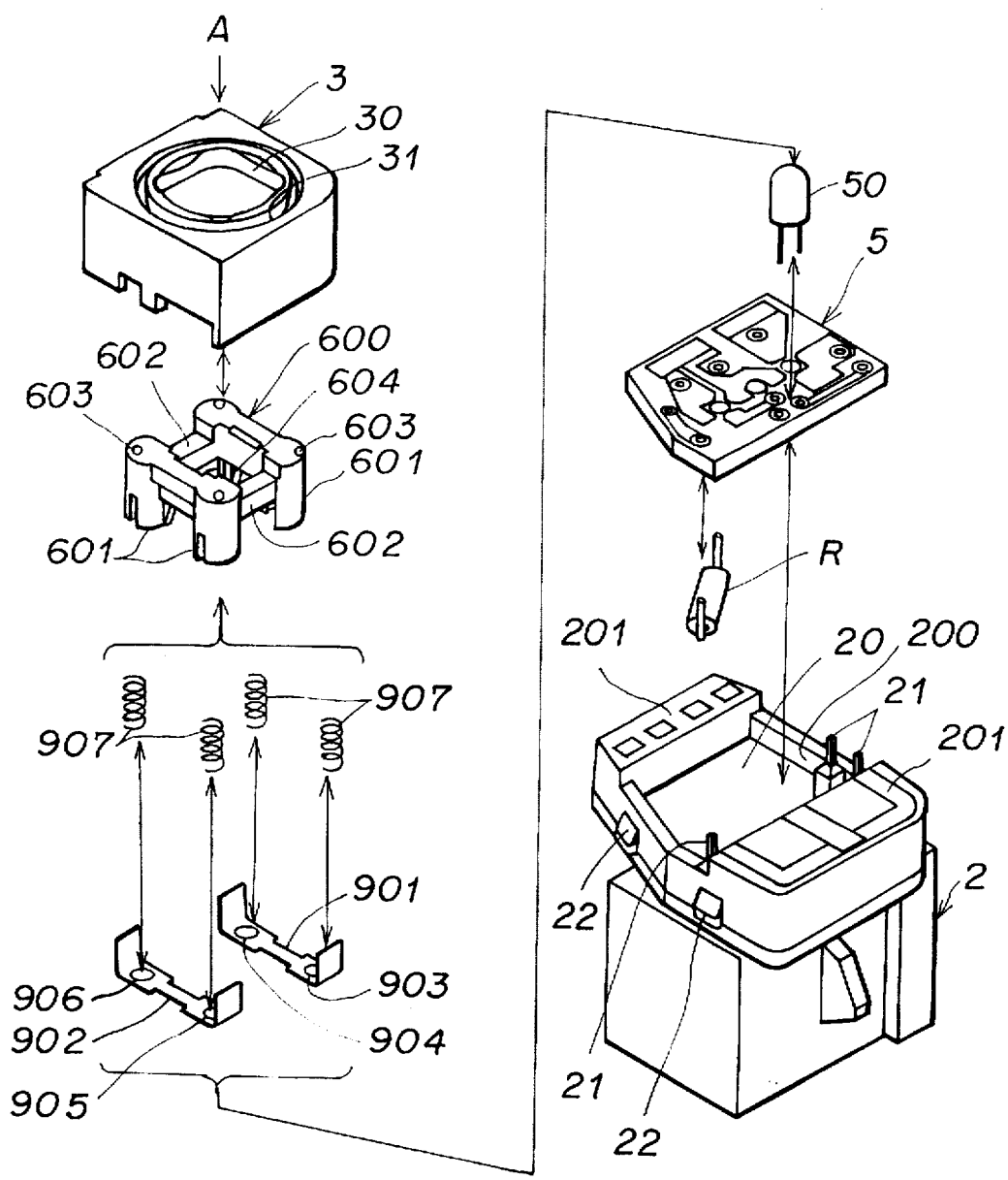

Note that when FIG. 1B is placed in such a relation to FIG. 1A that an arrow B in FIG. 1A comes to right above an arrow A in FIG. 1B, an exploded view showing the entire switching device according to the present invention can be provided.

In this embodiment, the switching device according to the present invention is used as a switch to vertically and horizontally turn the mirror surfaces of the right and left motor-driven, remote-controllable automotive side-view mirrors. More specifically, the switching device is used as a control switch to provide a forward or reverse run of a desired one of a drive motor provided for vertically tilting the mirror surface of the left side-view mirror, a drive motor for horizontally turning the mirror surface of the left side-view mirror, a drive motor for vertically tilting the mirror surface of the right side-view mirror, and a drive motor for horizontally turning the mirror surface of the right side-view mirror.

Figure 3:
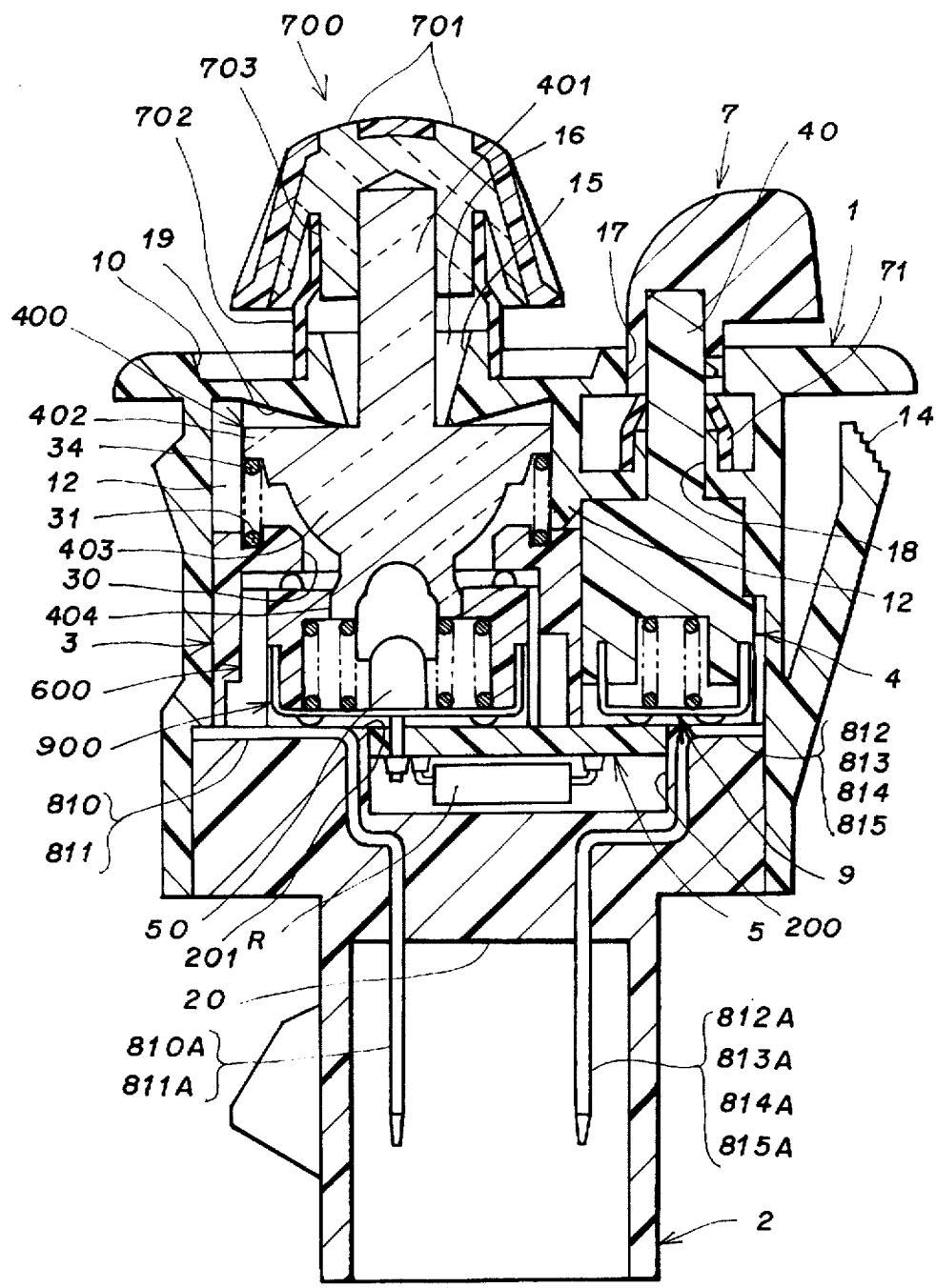
FIG. 3 is a sectional view taken along the line III—III in FIG. 2.

In FIGS. 1A and 3, the reference 1 indicates an upper case forming an upper half of a casing of the switching device according to the present invention. The upper case 1 is made of a synthetic resin, for example. It is hollow and open at the bottom thereof. The upper case 1 has a concavity 10 formed nearly in the center of the top thereof. The concavity 10 has a cylindrical projection 150 formed integrally on the bottom nearly in the center thereof. The projection 150 has a square through-hole 400 formed therein and which has a guide 16 formed at each of the four corners of the inner slant wall of the through-hole 400. These guides 16 are intended to guide an actuator 400 (will be described later) in four different directions. As will be seen from FIGS. 3 and 4, the lower surface of the top portion of the upper case 1 are also slant (shown at 19) in four directions to allow the actuator 400 to flit.

As shown in FIG. 3, the upper case 1 has also upper and lower rectangular through-holes 17 and 18 formed therein adjacent to the concavity 10. The upper case 1 has formed on the inner wall thereof a projection 12 for retaining an inner case (as will be described later). Also the upper case 1 has 2 a pair of rectangular engagement through-holes 13 formed in the lower portion on either side wall thereof. The upper case 1 has formed integrally on the outer surface thereof a resilient mounting portion 14 by which the switching device is to be installed to an instrument panel (not illustrated) before the driver's seat of a car.

As shown in FIGS. 1B and 3, the reference 2 indicates a lower case, or a holder, forming a lower half of the casing of the switching device according to the present invention. The lower case 2 is made of a synthetic resin or the like, for example. It is a size smaller than the bottom opening of the upper case 1, and has a bore 20 formed in the lower portion thereof and a concavity 200 formed in the center of a top 201 thereof. Namely, the remaining portion of the lower case 2 between the bore 20 and concavity 200 serves as a partition of the inner space of the lower case 2. The lower case 2 has formed integrally on either opposite side wall thereof a pair of rectangular engagement projections 22 mating with the engagement through-holes 13 in the upper case 1.

The lower case 2 is to be force-fitted into the bottom opening of the upper case 1 until the projections 22 in the lower case 2 are engaged into the through-holes 13, respectively, in the upper case. Thus, the upper and lower cases 2 and 3 are assembled together to form the casing of the switching device.

In FIGS. 1B and 3, the reference 3 indicates an inner case independent of both the upper and inner cases 1 and 2. The inner case 3 is to be set inside the upper case 1. It is also made of a same synthetic resin as used to form the upper and lower cases 1 and 2. The inner case 3 is hollow, a size smaller than the inside measurement of the upper case 1, and open at the bottom thereof. The inner case 3 has formed in the top portion thereof a square through-hole 30 which has a circular recess 31 formed around it.

In FIGS. 1B and 3, the reference 5 indicates a printed wiring board made of an insulation substrate. The printed wiring board 5 has provided on the upper and lower sides thereof electrically conductive paths formed by printing. The circuit board 5 is provided with an LED (light emitting diode) 50 on the upper side thereof and a resistor R on the lower side. The resistor R is provided to protect the LED 50.

The printed wiring board 5 is disposed in the central concavity 200 of the lower case 2 and under the inner case 3. The inner case 3 and printed wiring board 5 are disposed inside the upper case i and fixed between the bottom of the retaining projection 12 of the upper case i and the top 201 of the lower case 2. The top 201 of the lower case 2 and the upper side of the circuit board 5 are so disposed as to lie in a generally same plane.

Figure 8:
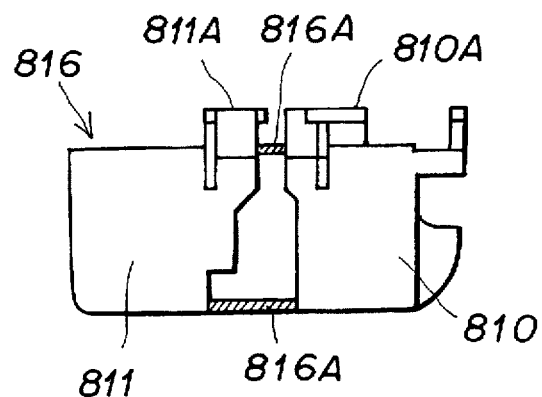
FIG. 8 is a plan view of the first group of fixed contacts forming together a four-way switch.

In FIG. 8, the reference 816 indicates a terminal member not yet integrated with the lower case 2 and which forms a part of the first group of fixed contacts for the four-way switch. The terminal member 816 is partially configured as terminals which can be inserted into a connector electrically connected to a motor or power source which will be described later. The terminal member 816 is made of an electrically conductive material. It is formed integrally by stamping or otherwise two first fixed contacts 810 and 811, two terminals 810A and 811A extending from the contacts 810 and 811, respectively, and couplings 816A (illustrated as hatched) connecting the fixed contacts 810 and 811 to each other.

At the time of injection-molding of the lower case 2, the two first fixed contacts 810 and 811 and the terminal member 816 are buried in the material of the lower case 2 to form an integration of these elements. After the molding, the couplings 816A are removed by punching or otherwise. The fixed contacts 810 and 811 are thus electrically isolated from each other, and also the terminals 810A and 811A are electrically isolated from each other. As shown from FIGS. 1B and 5, the two first fixed contacts 810 and 811 forming together the four-way switch is thus provided on one end portion of the top 201 of the lower case 2.

Figure 9:
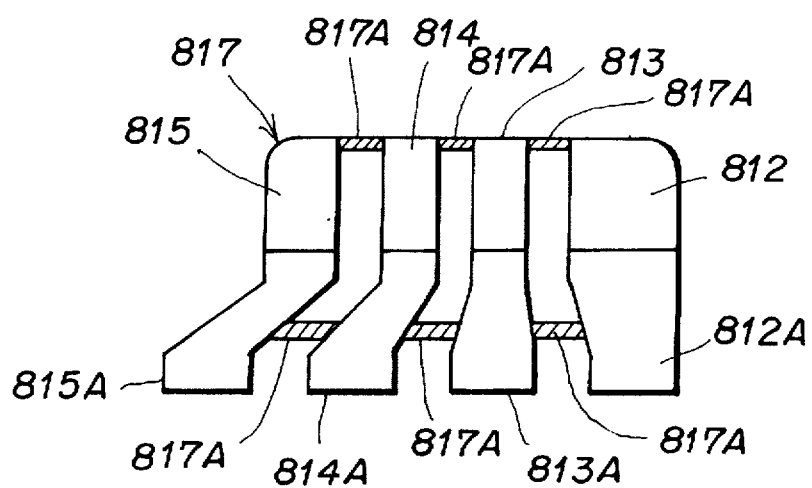
FIG. 9 is a plan view of the second group of fixed contacts forming together a two-way switch.

In FIG. 9, the reference 817 indicates a terminal member not yet integrated with the lower case 2 and which forms a part of the first group of fixed contacts for the two-way switch. The terminal member 817 is partially configured as terminals which can be inserted into a connector electrically connected to a motor or power source which will be described later. The terminal member 817 is made of an electrically conductive material. It is formed by stamping or otherwise four first fixed contacts 812, 813, 814 and 815, four terminals 812A, 813A, 814A and 815A extending from the contacts 812, 813, 814 and 815, respectively, and couplings 817A (illustrated as hatched) connecting the fixed contacts 812, 813, 814 and 815 to each other.

At the time of injection-molding of the lower case 2, the first fixed contacts 812, 813, 814 and 815 and the terminal members 812A, 813A, 814A and 815A are buried in the material of the lower case 2 to form an integration of these elements. After the molding, the couplings 817A are removed by punching or the like. The first fixed contacts 811, 813,814 and 815 are thus electrically isolated from each other, and also the terminals 812A, 813A, 814A and 815A are electrically isolated from each other. As shown from FIGS. 1B and 5, the four first fixed contacts 812, 813, 814 and 815 forming together a two-way switch is thus provided in a line on the other end portion of the top 201 of the lower case 2.

Figure 5:
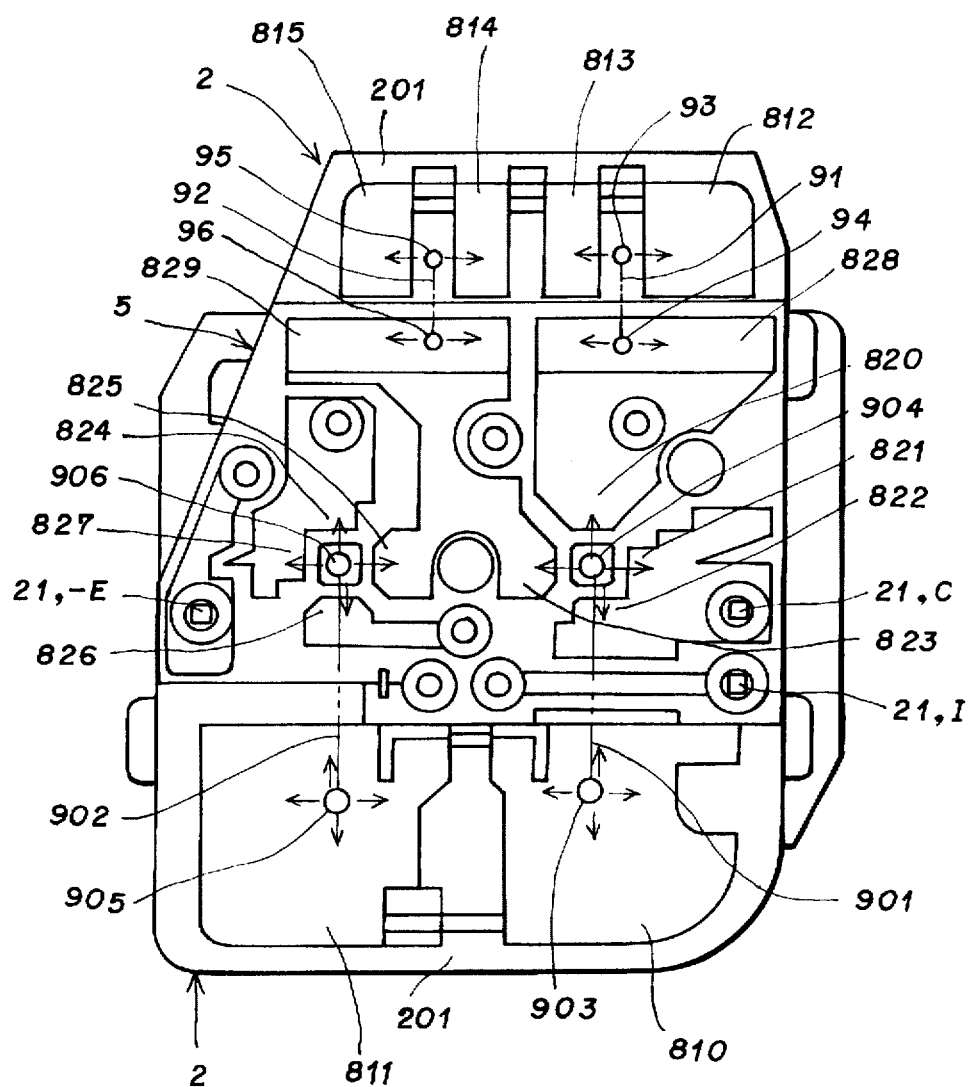
FIG. 5 a plan view showing a first group of fixed contacts disposed on the lower case and a second group of fixed contacts disposed on the printed wiring board.
Figure 6:
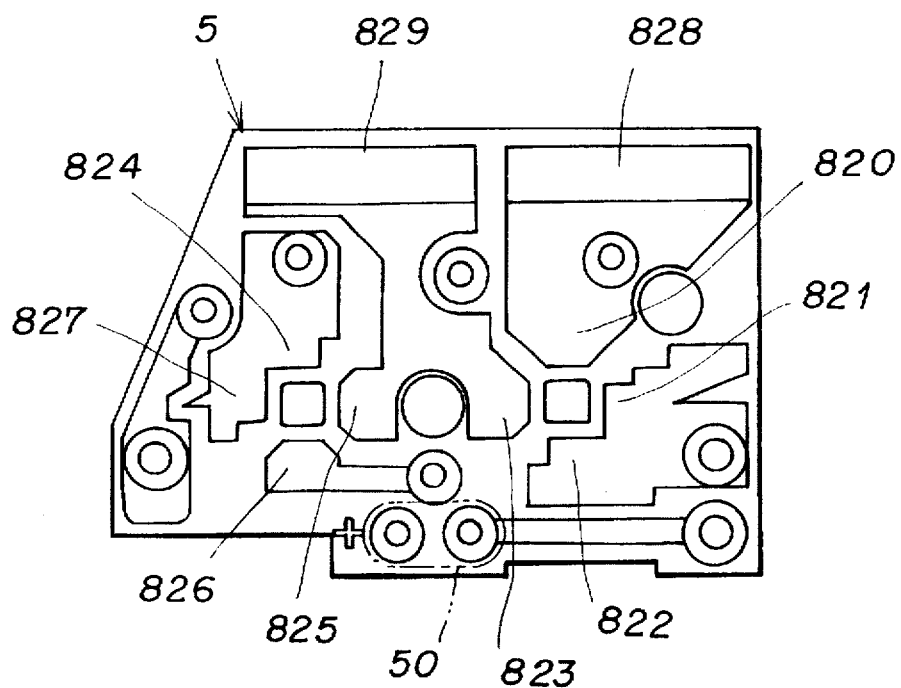
FIG. 6 is a plan view of the printed wiring board.
Figure 7:
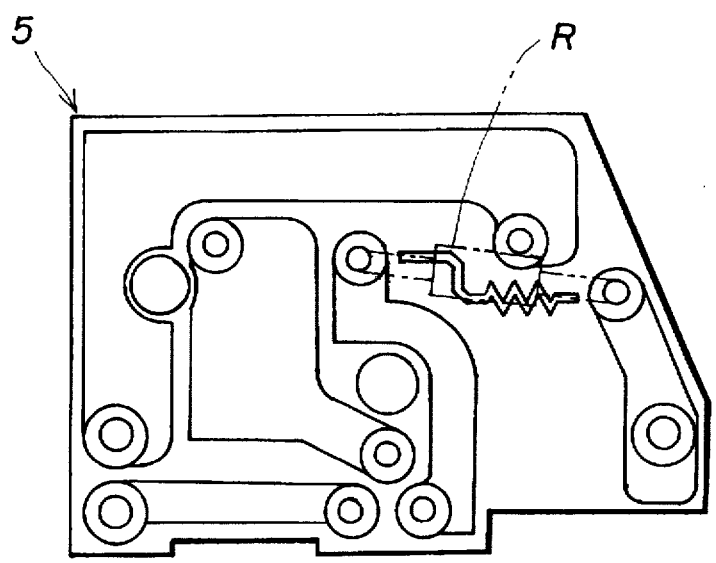
FIG. 7 is a bottom view of the printed wiring board.

In FIG. 5, the references 820, 821, 822, 823, 824, 825, 826 and 827 indicate eight second fixed contacts provided on the printed wiring board 5 and intended for use as a four-way switch. They are disposed horizontally and vertically around a predetermined position, namely, a neutral position. Also, the references 828 and 829 indicate two second fixed contacts, respectively, provided on the printed wiring board 5 and intended for use as a two-way switch.

Among the above-mentioned total of ten second fixed contacts, the contacts 820, 826 and 828; contacts 821, 822, 824 and 827; and contacts 823, 825 and 829, are electrically connected to one another in the respective groups on the printed wiring board 5.

Figure 4:
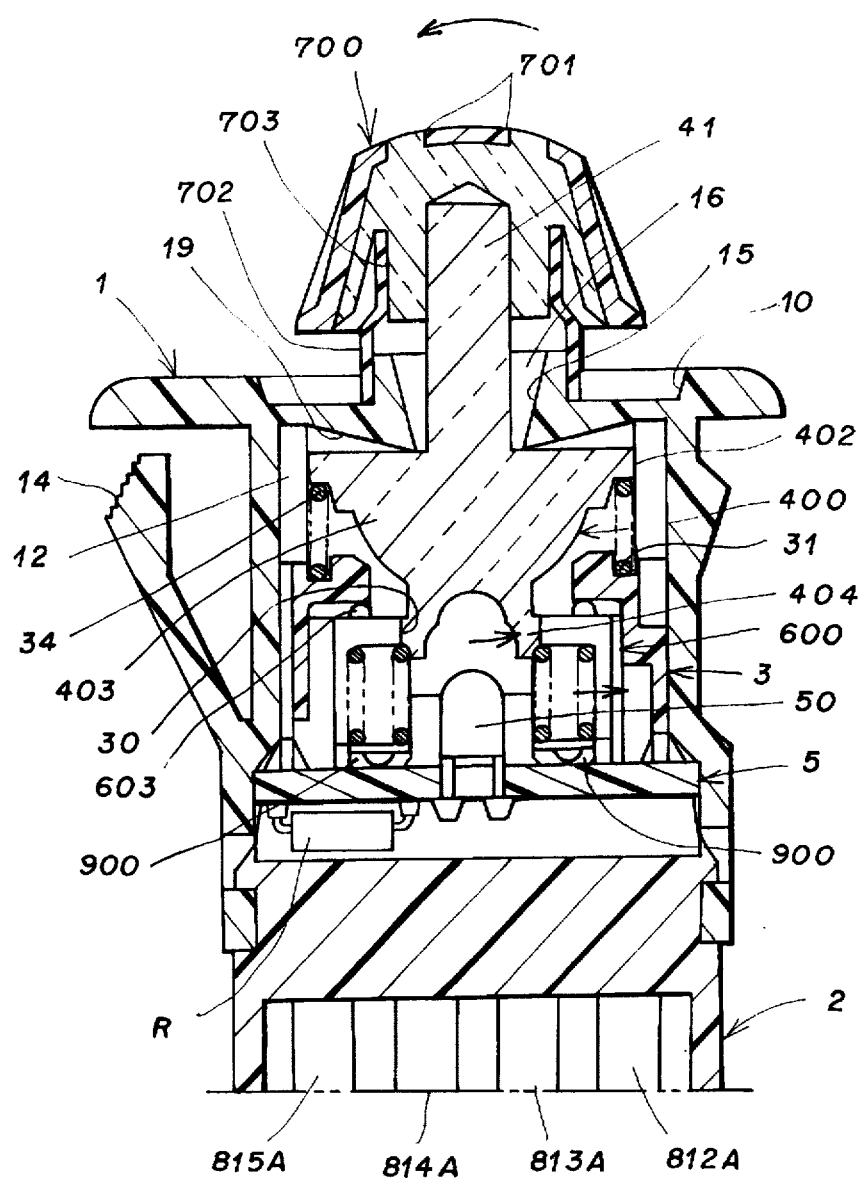
FIG. 4 is a sectional view taken along the line IV—IV in FIG. 2.

In FIGS. 1B, 3 and 4, the reference 600 indicates a slider for the four-way switch. The slider 600 is made of an insulation material such as a synthetic resin. It consists of four spring-receiving hollow cylindrical portions 60 1 open at the bottom thereof, and four coupling walls 602 connecting the four cylindrical portions 610 to each other. Each of the four cylindrical portions 601 has a small semi-spherical projection 601 formed on the top thereof. The slider 600 has a square engagement through-hole 604 formed in the center thereof as surrounded by the cylindrical portions 601 and coupling walls 602. The slider 600 is disposed between the inner case 3 and printed wiring board 5 inside the upper case 1 in such a manner as to be slidable in four directions.

In FIGS. 1A, 3 and 4, the reference 400 indicates an actuator for the four-way switch. The actuator 400 is made of a synthetic resin such as colorless, clear acrylic resin, and composed of a square column shaft 401, a square flange 402 formed integrally with the bottom of the shaft 401, a semi-spherical portion 403 formed integrally with the bottom of the flange 402, and four engagement legs 404 formed integrally with the bottom of the semi-spherical portion 403.

The flange 402 and semi-spherical portion 403 of the actuator 400 are placed between the upper and inner cases 1 and 3. The engagement legs 404 of the actuator 400 are passed through the hole 30 of the inner case 3 and engaged in the engagement hole 604 of the slider 600. Further, the shaft 401 of the actuator 400 is passed through the hole 15 in the upper case 1 and tilted as guided by the guides 16 in four directions. The actuator 400 is to be housed in the casing (consisting of the upper, lower and inner cases 1, 2 and 3) and installed to the slider 600.

The bottoms of the engagement legs 404 of the actuator 400 are to face the light source (LED) 50 through a small square through-hole 51 formed in the printed wiring board 5. The actuator 400 forms a part of the four-way switch, and also passes the light from the light source (LED) 50 to markings 701 provided on the four-way switch changeover knob 700 (will be described below).

As shown in FIGS. 1A, 3 and 4, the four-way switch changeover knob 700 is fitted and fixed on the top of the shaft 401 of the actuator 400 in such a manner as to be tiltable in four directions (vertically and horizontally) with respect to the casing of the switching device.

The changeover knob 700 is made of a translucent synthetic resin such as PMMA (polymethyl methacrylate). It has a top shaped in the form of a semispherically truncated pyramid. The changeover knob 700 has provided on the top thereof four translucent markings 701 corresponding to the four different directions in which the changeover knob 700 is to be moved or pushed. The translucent markings 70 1 are made by coating an opaque paint on other than the markings 701 on the outer surface of the translucent changeover knob 700. The markings 701 are illuminated by the light coming through the actuator 400 from the light source 50.

Note that the translucent markings 701 may be made by a bicolor coating using the above-mentioned translucent synthetic resin for the areas intended for the markings 701 themselves, and an opaque synthetic resin for the remainder of the changeover knob 700.

In this embodiment, the markings 701 are triangles oriented upward, downward, leftward and rightward correspondingly to the up-tilt, down-tilt, left-turn and right-turn, respectively, of the mirror surface (not shown). Alternately, however, they may be upward-, downward-, leftward- and rightward-oriented arrows for such directions, respectively, of mirror movement.

In FIGS. 1A, 3 and 4, the reference 702 indicates a packing for the four-way switch. The packing is a hollow cylinder. The packing 701 is water-tightly fitted at the lower end thereof onto the projection 150 of the upper case 1, and at the upper end thereof into an annular recess 703 formed in the bottom of the changeover knob 700.

In FIGS. 1A, 3 and 4, the reference 34 indicates auto-resetting springs for the four-way switch. The spring 34 is a large-diameter coil spring. It is placed as compressed between circular recess 31 formed in the inner case 3 and the lower side of the flange 402 of the actuator 400 to automatically reset the actuator 400, changeover knob 700 and slider 600, having been moved or tilted in any of the four directions, to their respective neutral positions. The actuator 400, changeover knob 700, slider 600, and the auto-resetting spring 34 form together the changeover member for the four-way switch.

In FIGS. 1B, 3 and 4, the reference 901 and 902 indicate two contact plates, respectively, for the four-way switch. They are made of an electrically conductive material, and each is installed to the bottom of the slider 600. The contact plates 901 and 902 have formed convex integrally therewith at both ends thereof two first moving contacts 903 and 905 for the four-way switch, and two second moving contacts 904 and 906 for the four-way switch, respectively.

Four springs 907 are housed in the four spring-receiving cylindrical portions 601, respectively, of the slider 600. The springs 907 will always force the first moving contacts 903 and 905 and second moving contacts 904 and 906 to the first fixed contacts 810 and 811 and second fixed contacts 820 to 827 by means of the contact plates 902 and 902. The moving contacts 903 to 906 are moved on the lower case 2 and printed wiring board 5 by means of the slider 600 when the changeover knob 700 is tilted in any of the four directions, and put into bridge-contact with the first fixed contacts 810 and 811 on the lower case 2 and the second fixed contacts 820 to 827 on the printed wiring board 5 by means of the contact plates 901 and 902, thereby forming a first, second, third and fourth circuits, respectively.

In FIGS. 1A and 3, the reference 4 indicates a slider for the two-way switch. The slider 4 is made of a transparent synthetic resin such as a colorless transparent acrylic resin. It is designed to have the general form of a block. The slider 4 has formed integrally nearly in the center of the top thereof a vertical shaft 40 extending upward, and also formed in the bottom thereof two spring-receiving cylindrical hollow portions 41 open at the bottom thereof.

The slider 4 is disposed inside the upper case i in such a manner as to be slidable to the right and left between the upper case 1 and printed wiring board 5. The shaft 40 of the slider 4 is passed through the rectangular through-hole 17 in the upper case 1, and projected out of the upper case 1.

In FIGS. 1A and 3, the reference 7 indicates a changeover knob for the two-way switch. The changeover knob 7 is made of a synthetic resin. It is to be fitted and fixed on the top of the shaft 40 of the slider 4. Thus, the changeover knob 7 is installed in such a manner as to be slidable laterally of the switching device casing.

In FIGS. 1A and 3, the reference 71 indicates a packing for the two-way switch. The packing 71 is a low, hollow rectangular parallelepiped open at the bottom thereof. It has a generally square engagement through-hole 72 formed in the center of the top thereof. The packing 71 is to be housed in the upper case 1. The shaft 40 of the slider 4 is closely fitted in the through-hole 72 of the packing 71, and the packing 71 is so fitted on the edge of the lower rectangular through-hole 18 of the upper case 1 that the shaft 40 can be slid in the sliding direction of the slider 4 and longitudinally of the rectangular through-hole 18.

In FIG. 1A, the references 42 and 43 indicate a ball and coil spring, respectively, forming together the changeover switch mechanism. The coil spring 43 is housed as compressed to one side of the slider 4, and the ball 42 is provided between the compressed spring 43 and a changeover recess (not shown) formed in the inner wall of the upper case 1.

The changeover recess consists of a central V-shaped bottom (not shown), first and second crests (not shown) at both sides of the V-shaped bottom, and first and second slopes (not shown) extending from the first and second crests, respectively. The ball 42 is forced to the changeover recess under the action of the spring 43.

In the change over mechanism, when the ball 42 is in the V-shaped bottom, the changeover knob 7 and slider 4 take their respective neutral positions. When the ball 2 is on the first slope, the changeover knob 7 and slider 4 are in their respective first positions. When the ball 42 is on the second slope, the changeover knob 7 and slider 4 take their respective second positions. The changeover mechanism is intended to provide a detent for the changeover knob 7 and slider 4 at their respective neutral, first and second positions. The ball 42 and coil spring 43 of the changeover mechanism are located between one side of the slider 4 and one side of the upper case 1. However, they may be located between the upper sides of the slider 4 and upper case 1, respectively.

The above-mentioned slider 4, changeover knob 7, ball 42 and coil spring 43 form together a changeover member for the two-way switch.

In FIGS. 1A and 3, the references 91 and 92 indicate two contact plates, respectively, for the two-way switch. The contact plates 91 and 92 are made of an electrically conductive material and fixed to the slider 4. Each of the contact plates 91 and 92 have formed integrally at both ends thereof two first moving convex contacts 93 and 95 for the two-way switch, and two second moving convex contacts 94 and 96 for another two-way switch. Two coil springs 97 are housed in the spring-receiving cylindrical hollow portions 41, respectively, in the slider 4. Thus, the first moving contacts 93 and 95 and the second moving contacts 94 and 96 are always pressed to the first fixed contacts 812 to 815 for the two-way switch and second fixed contacts 828 and 829 by means of the contact plates 91 and 92. Also, the moving contacts 93, 94, 95 and 96 are moved on the lower case 2 and printed wiring board 5 by means of the slider 4 in either of two directions, rightward and leftward, selected by operating the changeover knob 7, to have bridge contact with the first fixed contacts 812 and the second fixed contacts 828 and 829 on the printed wiring board through the contact plates 91 and 92, thereby forming a first circuit and a second circuit, respectively.

The switching device according to the present invention has the construction having been described in the foregoing. It functions as will be described herebelow.

Figure 2:
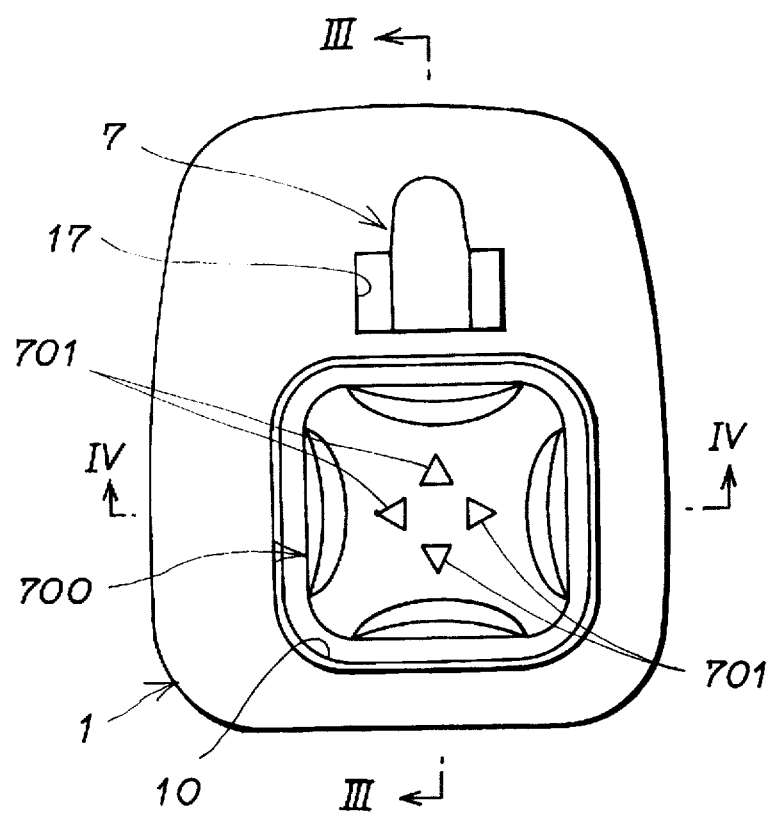
FIG. 2 is a plan view of the switching device according to the present invention.

First, when the two-way switch changeover knob 7 is shifted to the left or right position from the neutral position shown in FIG. 2, the movement of the changeover switch 7 is conveyed to the two-way switch slider 4 and the slider 4 in turn will be slid in a same direction between the upper case 1 and the lower case 2 and circuit board 5, thus the slider 4 takes either the first or second position.

As the two-way switch slider 4 is slid as in the above, two sets of contact assemblies 9 for the two-way switch are also slid on the lower case 2 and circuit board 5 in the same direction, so that the moving contacts 93 to 96 in the neutral position and the first fixed contacts 812 to 815 on the lower case 1 and second fixed contacts 828 and 829 on the circuit board are shift to their respective first or second position.

Next, when the two-way switch changeover knob 7 is moved from the first or second position to the neutral position, the two-way switch slider 4 is slid from the first or second position to the neutral position and also the two-way switch contact assemblies 9 are slid in a same direction, so that the moving contacts 93 to 96 in the first or second circuit and the first fixed contacts 812 to 815 on the lower case 2 and the second fixed contacts 828 and 829 on the circuit board 5 are shifted to their neutral positions.

In operation of the four-way switch, when the four-way switch changeover knob 700 shown in FIGS. 3 and 4 are in the neutral position, the actuator 400, four-way switch slider 600 and two sets of contact assemblies 900 for the four-way switch are in their respective neutral positions.

At this time, the fixed and free ends of the compressed auto-resetting spring 34 are always in elastic contact with the bottom of the recess 31 in the inner case 3 and the bottom of the flange 402 of the actuator 400, and thus the four-way switch changeover knob 700 in the neutral position is securely held by the upper and inner cases 1 and 2 by means of the auto-resetting spring 34.

Next, when the four-way switch changeover knob 700 is tilted in the direction of arrow shown in FIG. 4, the engagement 404 of the actuator 400 is pivoted in the opposite direction to the tilting direction of the four-way switch changeover knob 600 (in the direction of arrow shown in FIG. 4). Along with this movement, the four-way switch slider 600 and the two sets of four-way switch contact assemblies 900 slide on the lower case 2 and circuit board 5 in the direction of arrow shown in FIG. 4, so that the moving contacts 903 to 906 on the four-way switch contact assemblies 900 are put into contact with the first fixed contacts 810 and 811 of the lower case 2 and second fixed contacts 820 to 827 on the circuit board 5 to form the first circuit, for instance. At this time, the fixed end of the auto-resetting spring 34 is always in contact with the bottom of the recess 31 in the inner case 3 (not shown) while the free end of the auto-resetting spring 34 is compressed by the tilted side of the flange 402 of the actuator 400. Thus, the elasticity of the auto-resetting spring 34 acts upon the actuator 400 which in turn will be automatically reset to the neutral position thereof. When the four-way switch changeover knob 700 is stopped from being tilted, the elasticity of the auto-resetting spring 34 acts upon the actuator 400 which in turn will return to the initial neutral position with the result that the four-way switch slider 600 and four-way switch contact assemblies 900 to their initial neutral positions and thus the first circuit is opened. Note that when the four-way switch changeover knob 700 is tilted to any of the other three directions, a corresponding one of the second, third and fourth circuits is closed.

When the four-way switch changeover knob 700 is tilted up to form the first circuit while the two-way switch changeover knob 7 is placed at the left position and the two-way switch contacts form the first circuit, the mirror surface of the left side-view mirror is tilted up. When the four-way switch changeover knob 700 is tilted down to form the second circuit, the mirror surface of the left side-view mirror is titled down. When the four-way switch changeover knob 700 is tilted to the left to form the third circuit, the mirror surface of the left side-view mirror is turned to the left. When the four-way switch changeover knob 700 is tilted to the right to form the fourth circuit, the mirror surface of the left side-view mirror is turned to the right.

Next, when the four-way switch change over knob 700 is tilted up to form the first circuit while the two-way switch changeover knob 7 is placed at the right position and the two-way switch contacts form the second circuit, the mirror surface of the right side-view mirror is tilted up. When the four-way switch changeover knob 700 is tilted down to the second circuit, the mirror surface of the right side-view mirror is tilted down. When the four-way switch changeover knob 700 is tilted to the left to form the third switch, the mirror surface of the right side-view mirror is turned to the left. When the four-way switch changeover switch 700 is titled to the right to form the fourth circuit, the mirror surface of the right side-view mirror is turned to the right.

According to this embodiment, when the light source (LED) 50 is turned on, the light emitted from the light source 50 passes from the bottom to the top of the transparent actuator 400, and further through the four-way switch changeover knob 700 to any one in use of the markings 701 which thus will be illuminated. This illumination of the selected one of the four-way switch markings 701 will prevent the car driver from incorrectly operating the change over knob 700.

Also according to this embodiment, the packing 702 between the four-way switch changeover knob 700 and upper case 1 and the packing 71 between the two-way switch changeover knob 7 and upper case 1, provide the switching device with a water-tightness.

Note that the two-way switch changeover switch 7 may be provided thereon with similar markings to those on the four-way switch changeover knob 700 and a light guide be provided inside the upper and lower cases 1 and 2 to guide the light from the light source 50 through the light guide itself and two-way switch slider 4 to illuminate any one in use of the markings on the two-way switch changeover knob 7.

The moving contacts 93 to 96, 903 to 906 are convex ones formed integrally on the contact plates 91, 92, 901 and 902. However, they may be electroconductive balls so disposed on both end portions of flat contact plates as can roll.

As apparent from the foregoing description of the switching device according to this embodiment, the fixed contacts include the first group of fixed contacts 810 to 815 provided on the upper case 2 and the second group of fixed contacts 820 to 829 provided on the printed wiring board 5. This arrangement allows to make the printed wiring board 5 compact and reduce the number of places at which soldering has to be done on the printed wiring board 5.

Also, according to this embodiment, the first fixed contacts 810 to 815 and thermals 810A to 815A are formed integrally with each other, and these first fixed contacts 810 to 815 and terminals 810A to 815A are formed integrally with the lower case 2. Therefore, the number of elements can be reduced.

FIGS. 10 through 18 are circuit diagrams showing electric or circuit connections made when the switching device according to the aforementioned embodiment of the present invention is used with right and left automotive side-view mirrors to turn vertically and horizontally the mirror surface of the side-view mirror.

In Figures, the reference A1 indicates a drive provided to turn vertically and horizontally the mirror surface of a right remote-controllable side-view mirror. The drive comprises a first motor M11 to tilt the mirror surface vertically and a second motor M12 to turn the mirror surface horizontally.

In Figures, the reference A2 indicates a drive provided to turn vertically and horizontally the mirror surface of a left remote-controllable side-view mirror. The drive comprises a first motor M21 to tilt the mirror surface vertically and a second motor M22 to turn the mirror surface horizontally.

In Figures, the reference SW indicates the switching device according to the present as a whole. SW1 indicates the four-way switch and SW2 indicates the two-way switch.

The aforementioned terminals 21, 810A to 815A are electrically connected to a power source +B such as a car battery, ground potential E, the first and second motors M11 and M12 of the drive A1 for the right side-view mirror, the first and second motors M21 and M22 of the drive A2 for the left side-view mirror, and a power source I for the light source (LED) 50, respectively.

Circuit configurations and corresponding vertical tilting and horizontal turning of the mirror surfaces of the right and left remote-controlled side-view mirrors, obtained by tilting the four-way switch SW1 to a position for a selected direction of the mirror surface turn and sliding the two-way switch S2 of the switching device SW to a position for a selected one of the right and left side-view mirrors, will be described herebelow.

Figure 10:
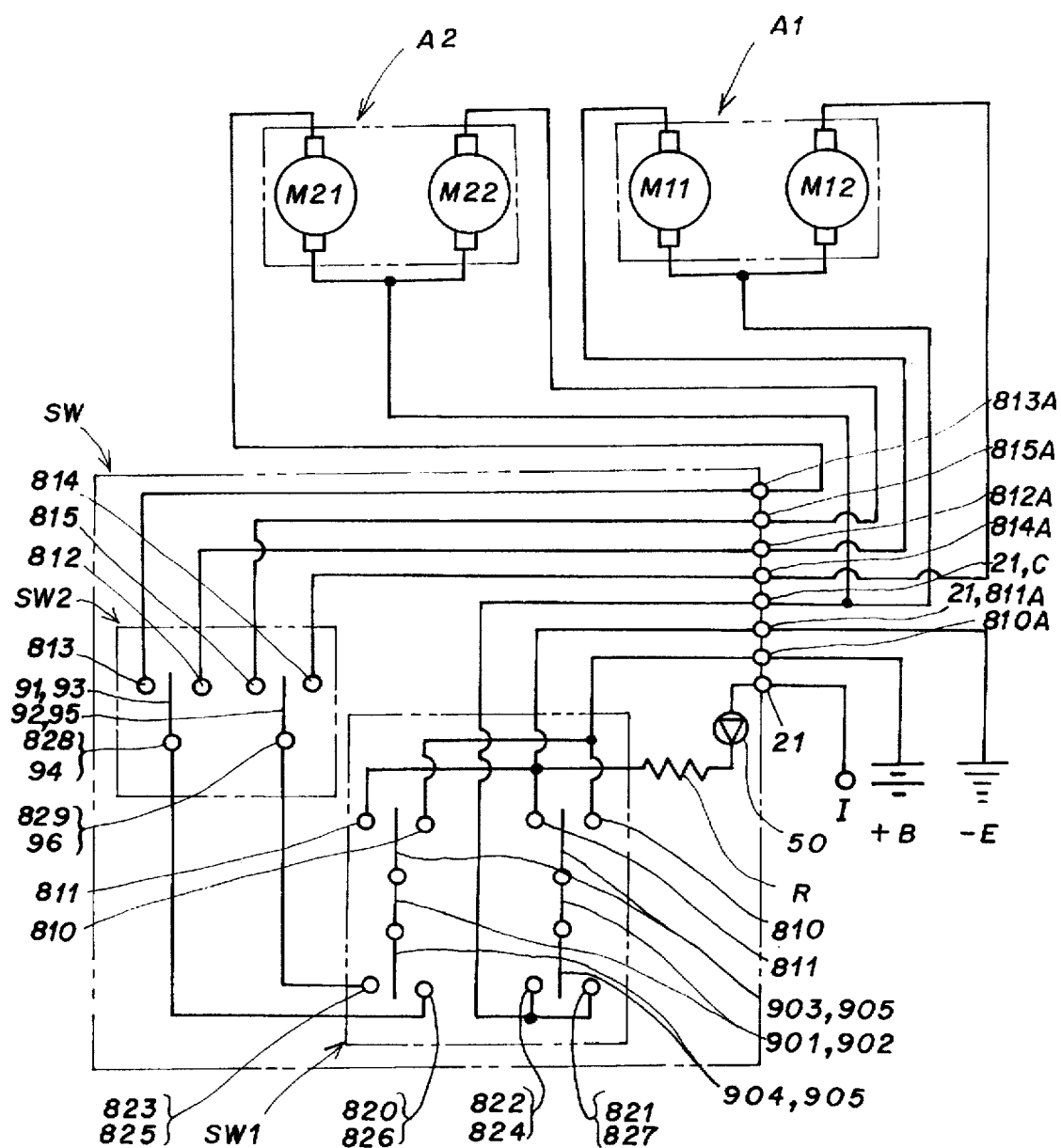
FIG. 10 diagrammatically shows a circuit formed in case the switching device according to the present invention is used as a control switch for two, right and left, side-view mirrors, for example, to tilt and turn each mirror surface, the changeover member being placed at the neutral position.
Figure 11:
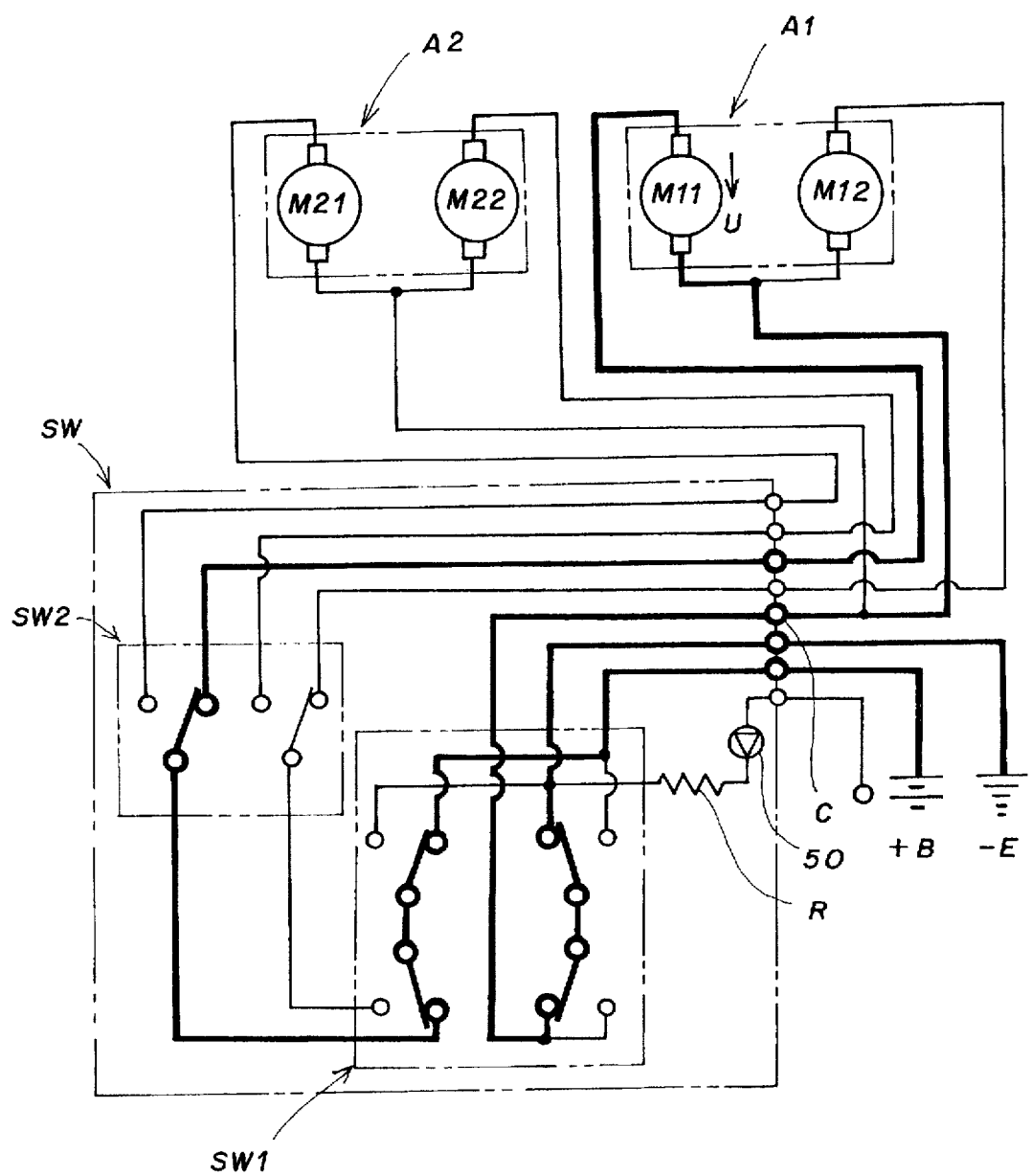
FIG. 11 diagrammatically shows a circuit connection formed for tilting up the mirror surface of the right side-view mirror in FIG. 10.

The circuit configuration shown in FIG. 10 is for the neutral position of the switching device SW. First, the two-way switch change over knob 7 is slid to the right in this condition of the switching device SW. Thus the two-way switch SW1 will act to set up the drive A1 for the right side-view mirror as shown in FIGS. 11 through 14.

Then the four-way switch changeover knob 700 is tilted up. The moving contacts 903 to 906 of the two sets of contact assemblies 900 will be moved as shown with thick solid lines in FIG. 11 so that the current will flow in the direction of arrow U to the first motor M11 of the drive A1 for the right side-view mirror. The first motor M11 of the drive A1 will run forward to tilt up the mirror surface of the right side-view mirror.

Figure 12:
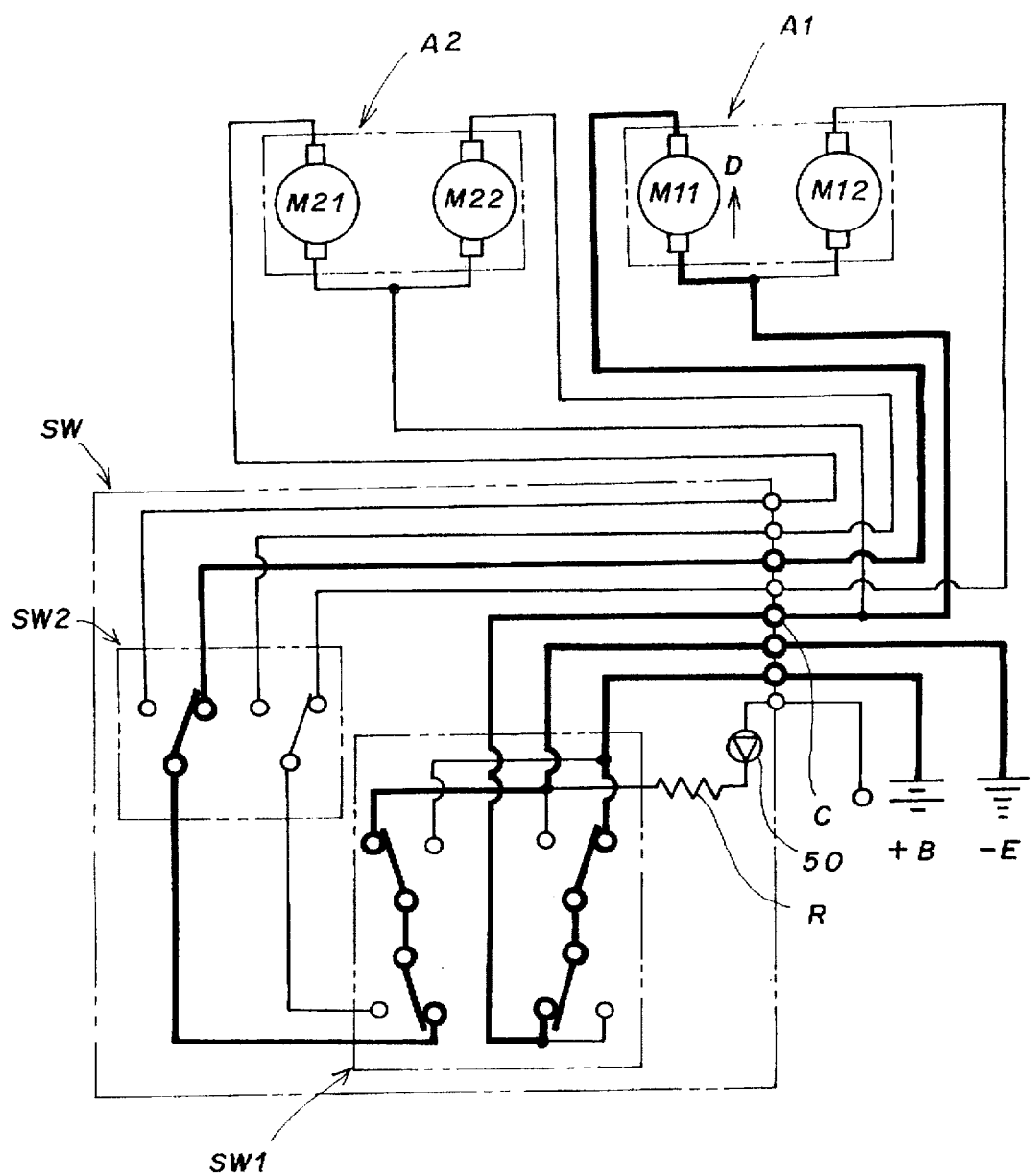
FIG. 12 diagrammatically shows a circuit connection formed for tilting down the mirror surface of the right side-mirror in FIG. 10.

When the knob 700 is tilted down, the moving contacts 903 to 906 of the two sets of contact assemblies 900 will be moved as shown with thick solid lines in FIG. 12 so that the current will flow in the direction of arrow D to the first motor M11 of the drive A1. The first motor M11 will run reversely to tilt down the mirror surface of the right side-view mirror.

Figure 13:
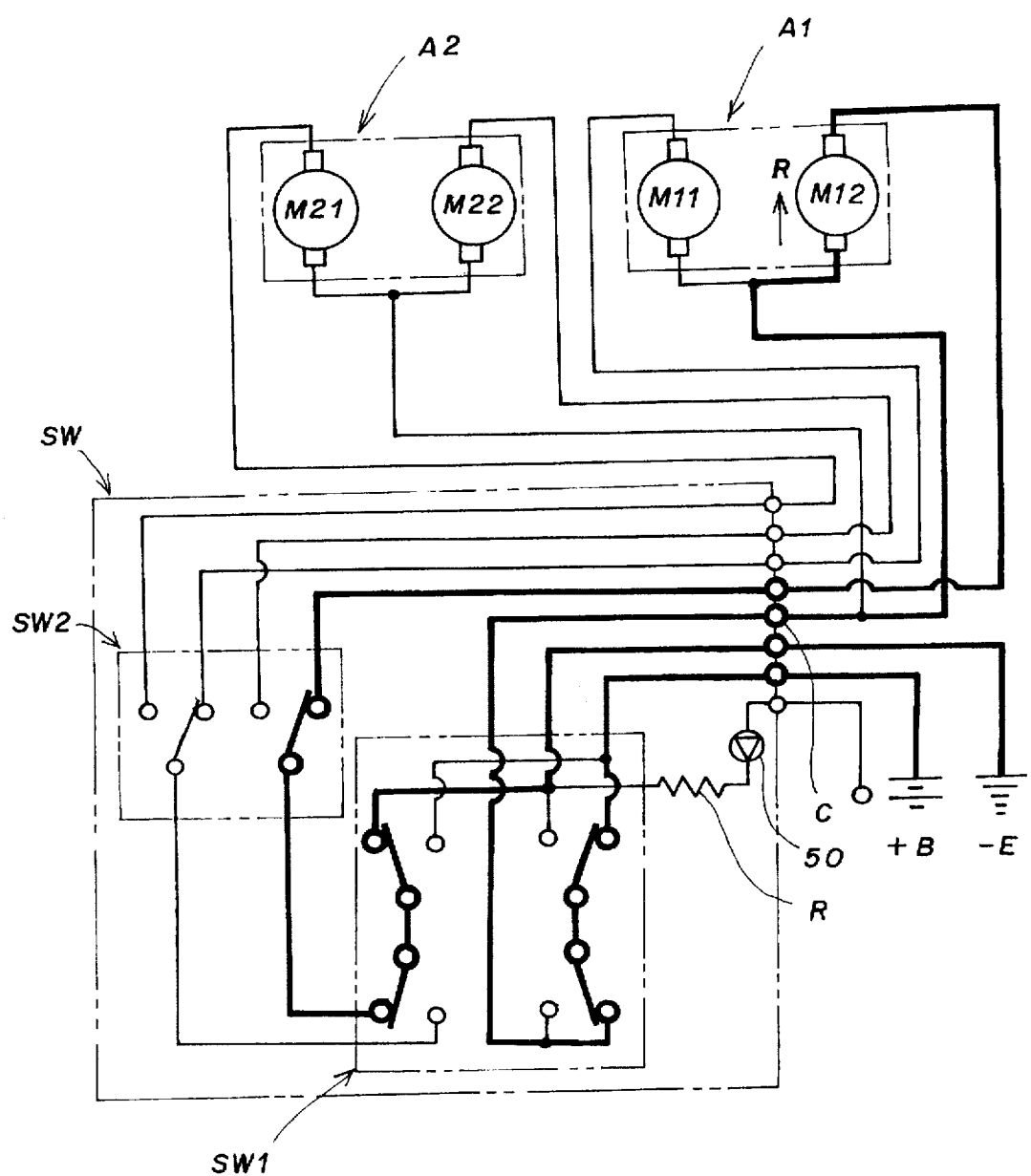
FIG. 13 diagrammatically shows a circuit connection formed for turning the mirror surface the right side-mirror in FIG. 10 to the right.

Also, when the knob 700 is turned to the right, the moving contacts 903 to 906 of the two sets of contact assemblies 900 will be moved as shown with thick solid lines in FIG. 13 so that the current will flow in the direction of arrow R to the second motor M12 of the drive A1. The first motor M12 will run forward to turn to the right the mirror surface of the right side-view mirror.

Figure 14:
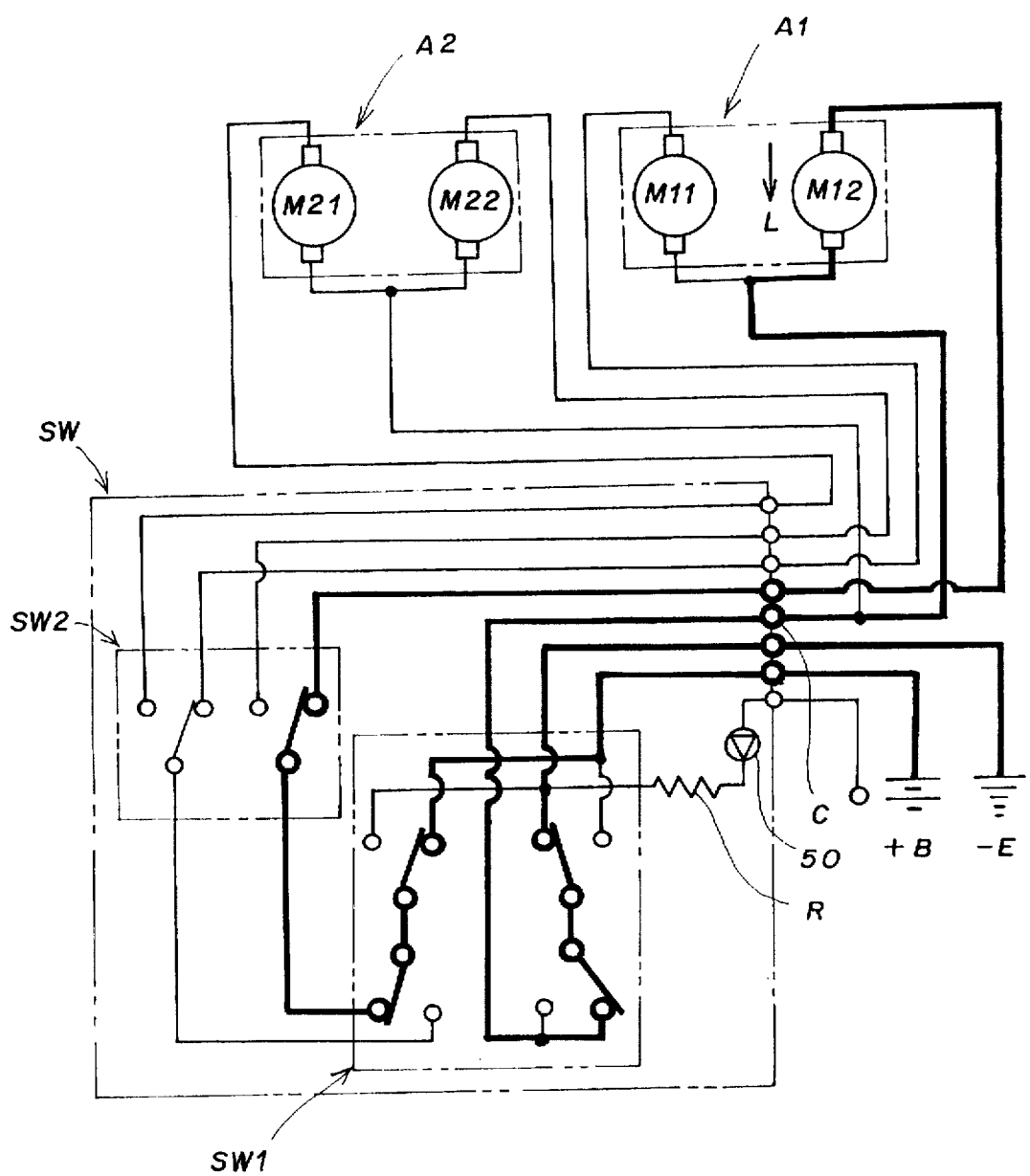
FIG. 14 diagrammatically shows a circuit connection formed for turning the mirror surface of the right side-mirror in FIG. 10 to the left.
Figure 15:
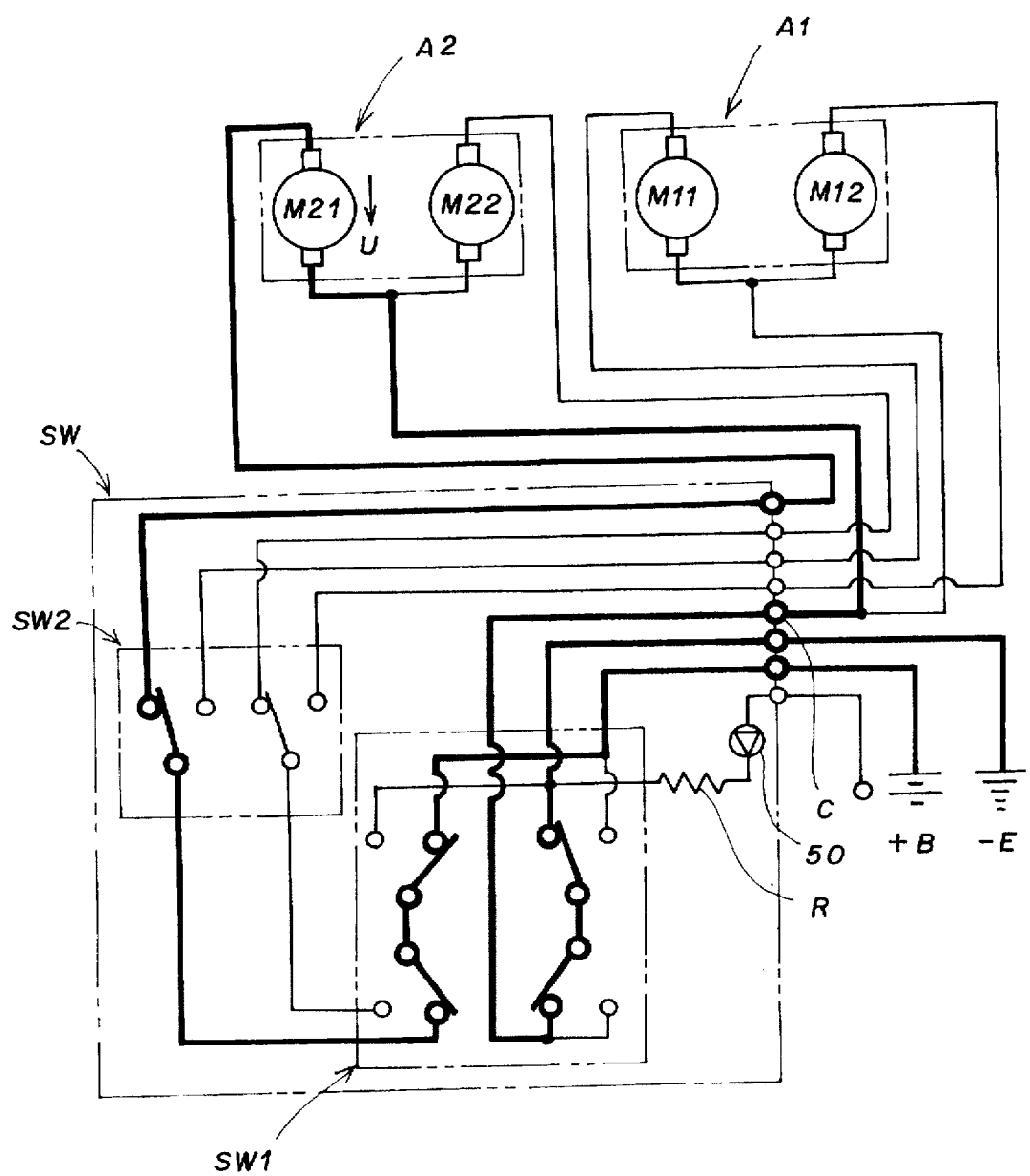
FIG. 15 diagrammatically shows a circuit connection formed for tilting up the mirror surface of the left side-view mirror in FIG. 10.

Further, when the knob 700 is turned to the left, the moving contacts 903 to 906 of the two sets of contact assemblies 900 will be moved as shown with thick solid lines in FIG. 14 so that the current will flow in the direction of arrow L to the second motor M12 of the drive A1. The first motor M12 will run reversely to turn to the left the mirror surface of the right side-view mirror.

Next, the two-way switch changeover knob 7 is slid to the left. Thus the two-way switch SW2 will act to set up the drive A2 for the left side-view mirror as shown in FIGS. 15 through 18.

Then the four-way switch changeover knob 700 is tilted up. The moving contacts 903 to 906 of the two sets of contact assemblies 900 will be moved as shown with thick solid lines in FIG. 15 so that the current will flow in the direction of arrow U to the first motor M21 of the drive A2 for the right side-view mirror. The first motor M21 of the drive A2 will run forward to tilt up the mirror surface of the left side-view mirror.

Figure 16:
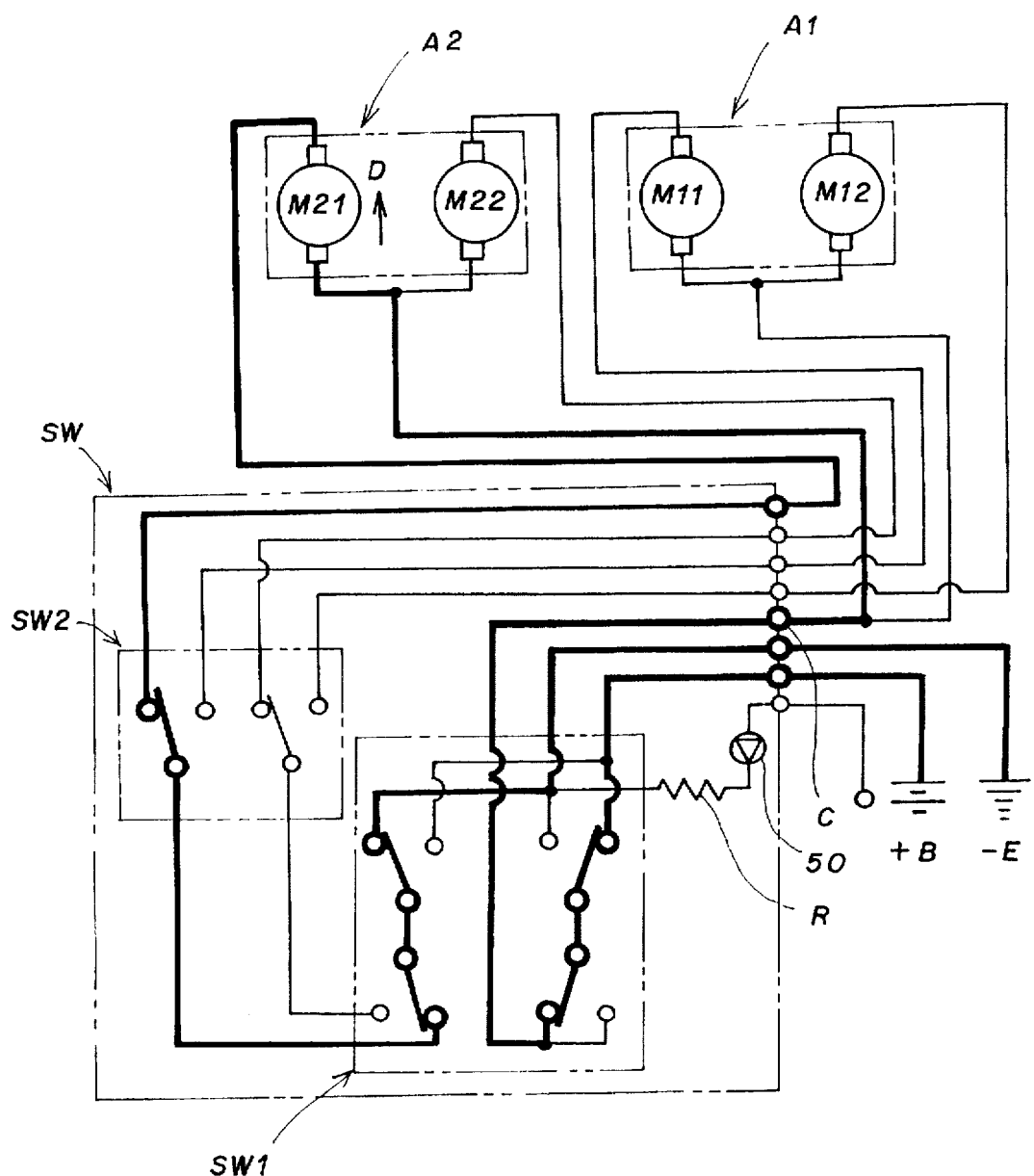
FIG. 16 diagrammatically shows a circuit connection formed for tilting down the mirror surface of the left side-mirror in FIG. 10.

When the knob 700 is tilted down, the moving contacts 903 to 906 of the two sets of contact assemblies 900 will be moved as shown with thick solid lines in FIG. 16 so that the current will flow in the direction of arrow D to the first motor M21 of the drive A2. The first motor M21 will run reversely to tilt down the mirror surface of the left side-view mirror.

Figure 17:
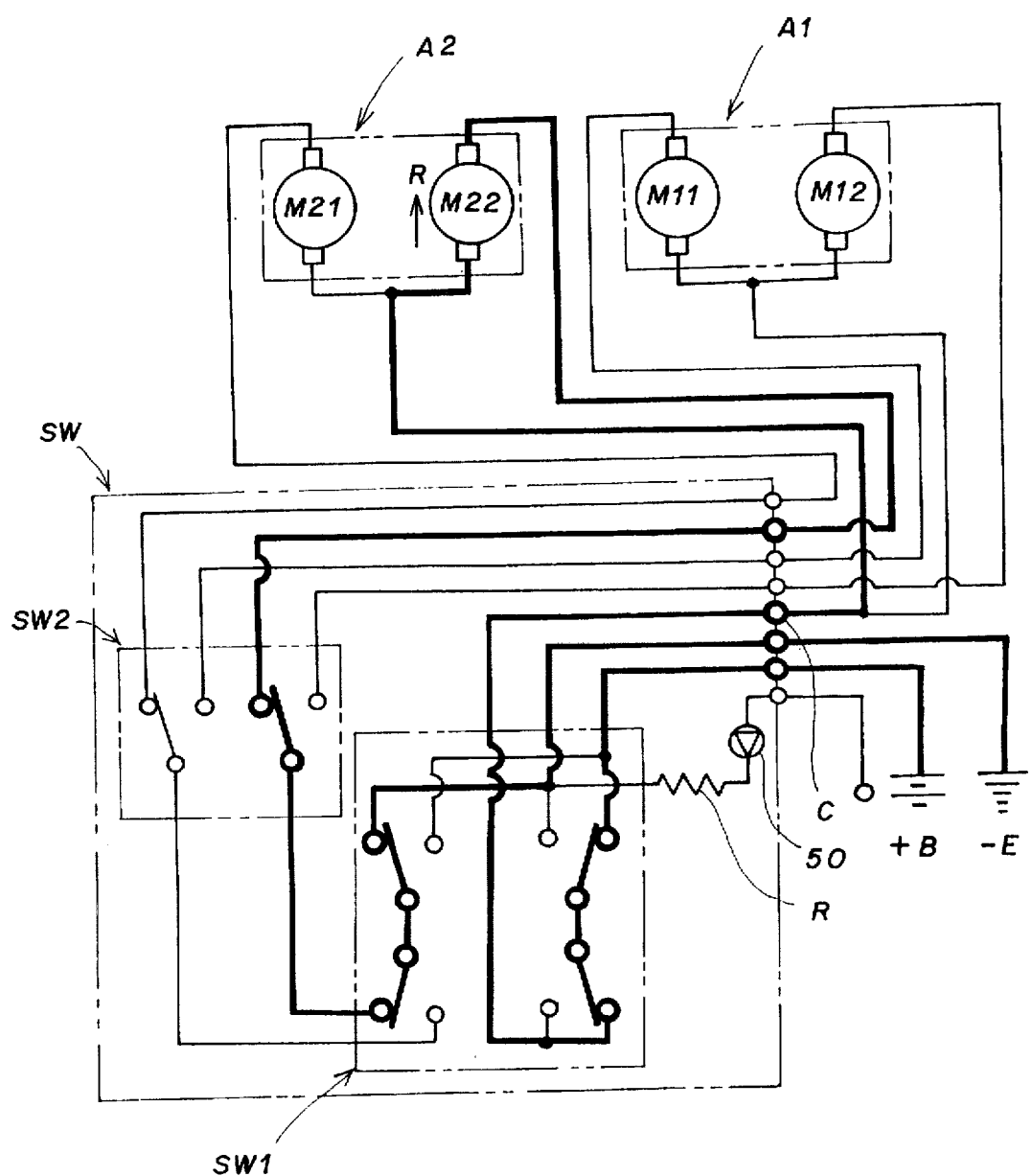
FIG. 17 diagrammatically shows a circuit connection formed for turning the mirror surface of the left side-mirror in FIG. 10 to the right.

Also, when the knob 700 is turned to the right, the moving contacts 903 to 906 of the two sets of contact assemblies 900 will be moved as shown with thick solid lines in FIG. 17 so that the current will flow in the direction of arrow R to the second motor M22 of the drive A2. The first motor M22 will run forward to turn to the right the mirror surface of the left side-view mirror.

Figure 18:
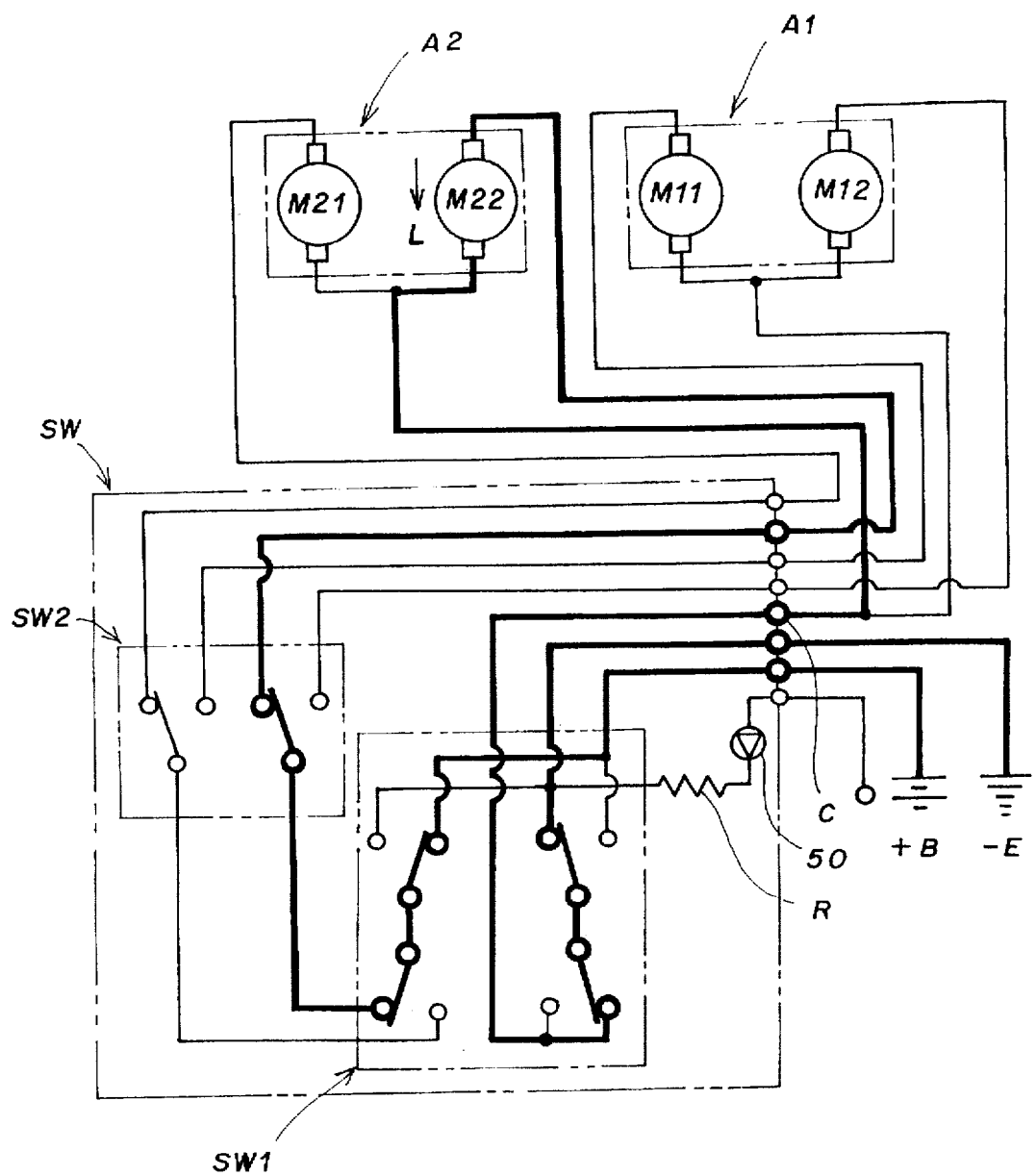
FIG. 18 diagrammatically shows a circuit connection formed for turning the mirror surface of the left side-mirror in FIG. 10 to the left.

Further, when the knob 700 is turned to the left, the moving contacts 903 to 906 of the two sets of contact assemblies 900 will be moved as shown with thick solid lines in FIG. 18 so that the current will flow in the direction of arrow L to the second motor M22 of the drive A2. The first motor M22 will run reversely to turn to the left the mirror surface of the left side-view mirror.

The aforementioned embodiment of the switching device according to the present invention has been described as to the application to a remote control switch intended for turning the mirror surfaces of right and left side-view mirrors of a car vertically and horizontally. The application is a combination of the four-way switch and two-way switch. However, the switching device according to the present invention is not limited this application, but is can be applied to any single two- or four-way switch or all other switches.

What is claimed is:

1. A switching device, comprising:
    a casing;
    a printed wiring board disposed inside said casing;
    a first fixed contact group including a plurality of fixed contacts formed integrally with said casing, each of said fixed contacts consisting of a contact portion lying substantially in a plane in which said printed wiring board also lies and a terminal portion extended to outside said casing;
    a second fixed contact group including a plurality of fixed contacts formed on said printed wiring board; and
    a changeover member provided with first and second moving contacts corresponding to said first and second fixed contact groups and which are disposed movably inside said casing;
    said first and second moving contacts being so arranged as to slide and make an electrical connection or disconnection between said first and second fixed contact groups as said changeover member is moved.

2. The switching device according to claim 1, wherein said plurality of fixed contacts included in said first fixed contact group are buried integrally in said casing being molded and said plurality of fixed contacts included in said second fixed contact group are formed on said printed wiring board through wiring by printing.

3. The switching device according to claim 2, wherein said plurality of fixed contacts included in said second fixed contact group are disposed vertically and horizontally around a predetermined position on said printed wiring board.

4. The switching device according to claim 3, wherein said changeover member comprises:
    a slider disposed inside said casing in such a manner as to be slidable horizontally and vertically;
    an actuator housed in said casing and installed to said slider;
    a changeover knob installed to said actuator and said casing in such a manner as to be tiltable horizontally and vertically; and
    a spring to automatically reset said slider, actuator and changeover knob to their respective neutral positions.

5. The switching device according to claim 4, wherein said actuator is made of a translucent material, said changeover knob is provided thereon with translucent markings, and said casing is provided therein with a light source, the light emitted from said light source passing through said actuator to said markings on said changeover knob to illuminate any selected one of said markings.

6. The switching device according to claim 4, wherein a packing is provided between said changeover knob and said casing.

7. The switching device according to claim 2, wherein said first and second moving contacts are projections integrally formed on end portions of electrically conductive contact plates installed on said changeover member, and always forced toward said first and second fixed contacts under the action of springs provided between said changeover member and contact plates.

8. The switching device according to claim 2, wherein said plurality of fixed contacts included in said second fixed contact group are disposed vertically or horizontally around a predetermined position on said printed wiring board.

* * * * *